United States Patent Office 3,093,734
Patented June 11, 1963

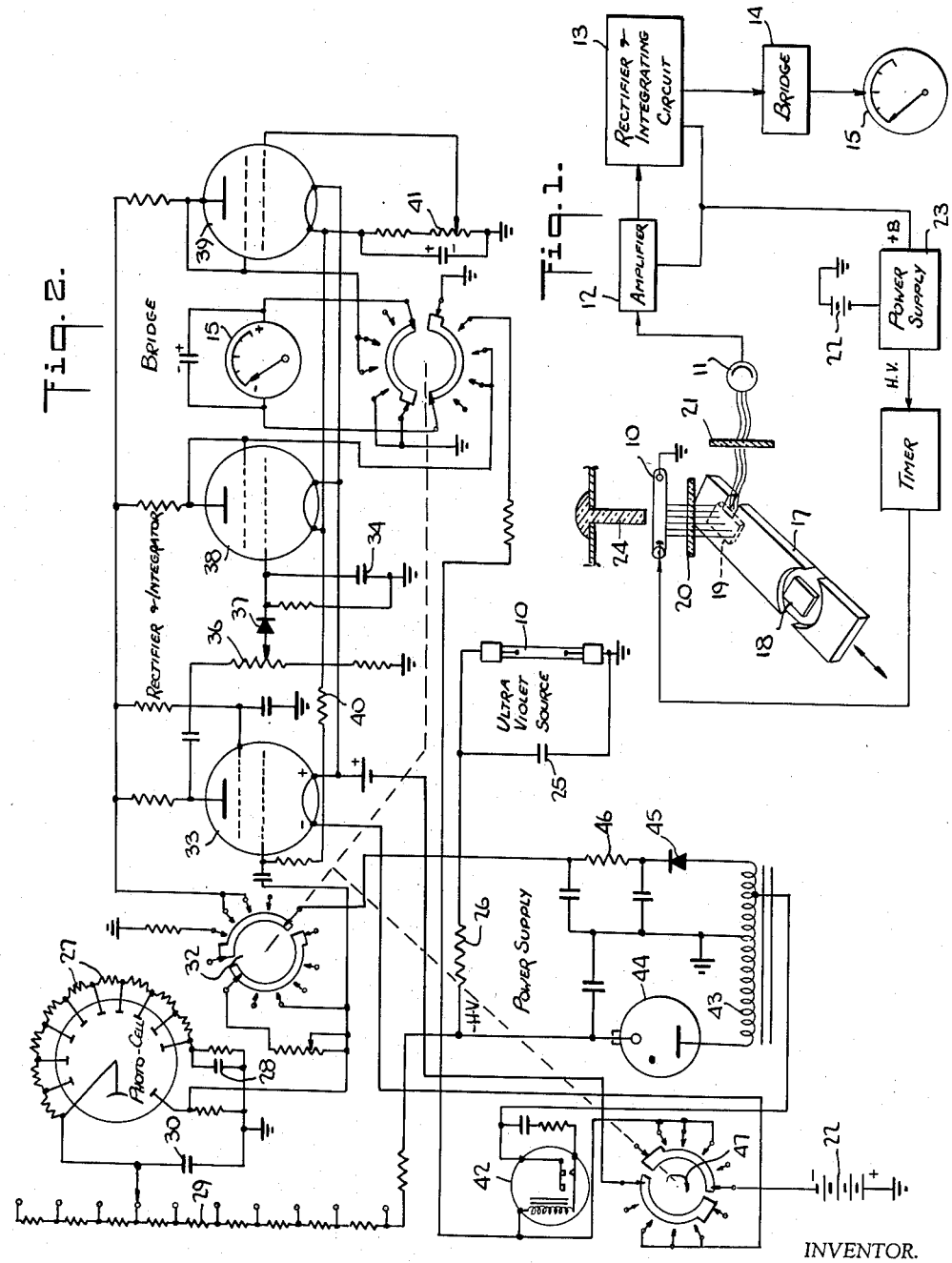

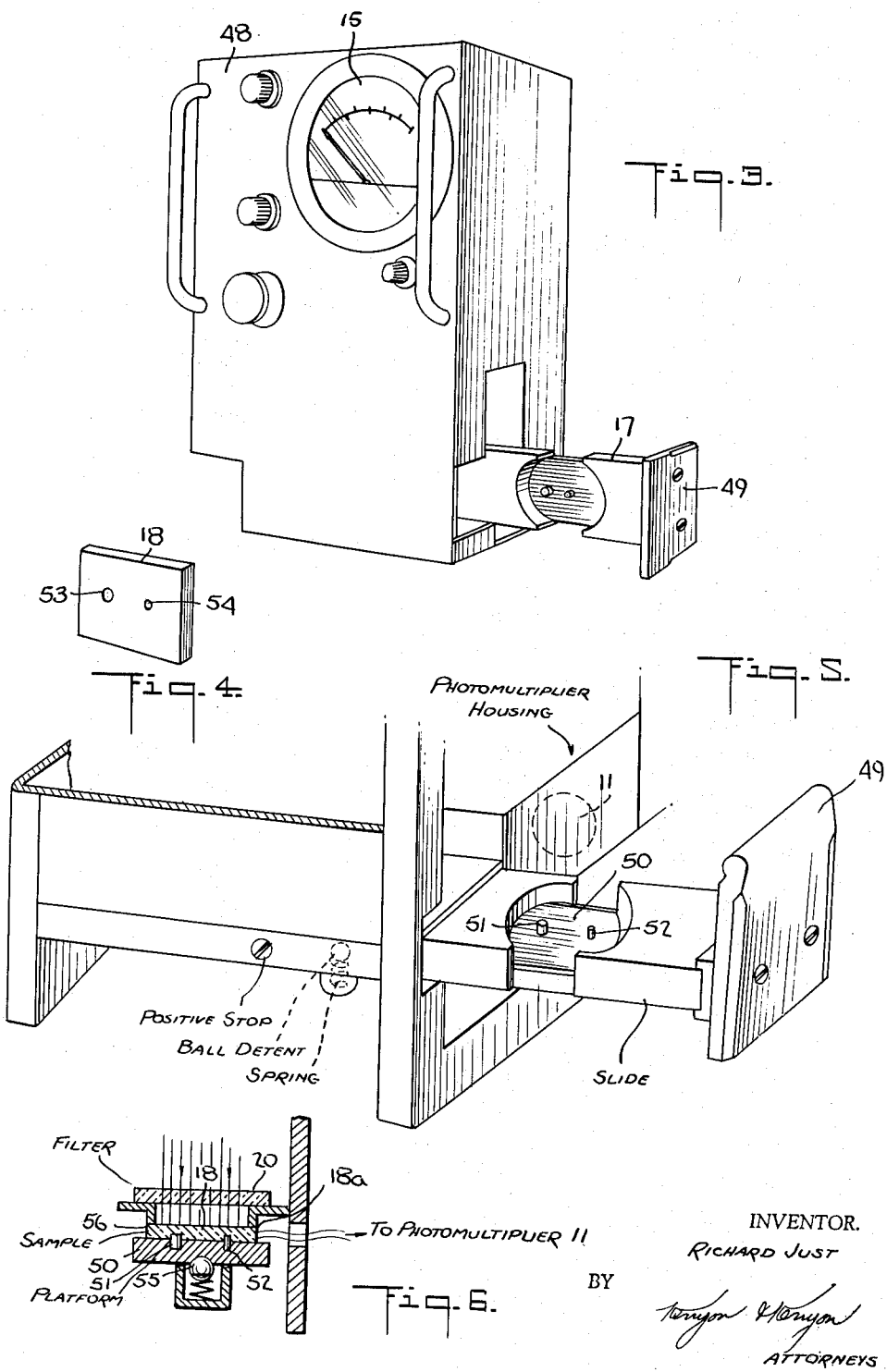

3,093,734
RADIATION DOSIMETER READER
Richard Just, Flushing, N.Y., assignor to Specialty Engineering & Electronics Company, Brooklyn, N.Y., a partnership composed of Herman Sondov, Theodore Sondov, Max Corriel, and H. Russell Cammer
Filed Sept. 22, 1958, Ser. No. 762,466
8 Claims. (Cl. 250—71.5)

The present invention relates generally to radiation dosimeter readers and more particularly to a portable instrument for computing and indicating the total amount of radiation to which a dosage detector has been exposed.

The hazards of radiation are now such that it is common practice to require individuals exposed to radioactive sources to wear a detector sensitive to X-ray and gamma-ray radiation for effectively totalizing the radiation dosage to which the wearer has been subjected. One widely used detector of this type is constituted by a specially prepared silver-activated square of phosphate glass. When the total radiation dosage of such detectors is to be measured, the detector is irradiated by ultra-violet light which causes the glass to luminesce, the intensity of luminescence being proportional to the accumulated radiation the glass has received.

In the interest of safety it has become increasingly important quickly to compute and indicate the total radiation to which the detectors have been exposed, in order that the wearer can be made aware of dangerous radiation conditions without delay. By repeated checks on the detector, the wearer will be informed of any important changes in the level of radiation to which he is being subjected.

In view of the foregoing, it is the principal object of this invention to provide a suitable dosimeter reader of efficient and compact design which requires no external source of power for its operation.

Also an object of the invention is to provide a dosimeter reader adapted to compare the luminescence of a test detector which has been exposed to radiation of an unknown level with a reference detector or standard to produce an accurate indication of the total radiation dosage of the test detector.

A significant advantage of the use of a standard is that the dosimeter has a very large operating range, which range is independent of voltage changes, ambient temperatures, variations and the aging of components, which factors in conventional instruments result in spurious indications.

Also an object of the invention is to provide a loading mechanism for inserting a radiation detector in a dosimeter reader and for automatically locating the detector into its proper position relative to an ultra-violet irradiation source and to a photomultiplier adapted to pick up light rays from the detector.

A further object of the invention is to provide a battery operated portable dosimeter reader having a very low power consumption, whereby protracted battery life is obtained.

For a better understanding of the invention as well as other objects and features thereof, reference is made to the following detailed description to be read in conjunction with the accompanying drawings wherein like components in the figures are represented by like reference numerals.

In the drawings:
FIG. 1 is a block diagram of a dosimeter reader in accordance with the invention.
FIG. 2 is a schematic circuit diagram of the reader.
FIG. 3 is a perspective view of the reader structure showing the loading mechanism for the dosimeter.
FIG. 4 separately shows a sample dosimeter element.
FIG. 5 is a perspective view of the loading mechanism.
FIG. 6 in section shows the position of the sample when irradiated by the light source.

*The Basic System*

Referring now to FIG. 1, a dosimeter reader in accordance with the invention comprises an ultra-violet light source 10 for irradiating dosimeters, the luminescence of the dosimeter being intercepted by a light sensitive element 11 whose output is first amplified in amplifier 12, and then rectified and integrated in stage 13. The output of stage 13 is applied to an electrometer bridge 14 to which is coupled an indicator 15 which is preferably calibrated in roentgen units.

Uultra-violet source 10 is actuated by a timer circuit 16 to produce a continuous source of bluish-white pulses of light having a repetition rate in the order of two to four pulses per second. A light-tight loading mechanism serves to introduce the specimen to the dosimeter reader. The loading mechanism is in the form of a sliding bar 17 provided with a platform for accommodating a test dosimeter element 18 and a standard element 19, the standard being permanently built into the bar and permitting the operator to check the calibration of the system whenever a new unknown dosimeter is being measured. Bar 17 is adapted to shift either the standard or the test element into irradiation position relative to the ultra-violet source 10.

The test dosimeter 18 is preferably constituted by a specially prepared silver-activated square wafer of phosphate glass which is sensitive to X and gamma radiation, such that when later exposed to ultra-violet light the wafer will emit an orange luminescence having an intensity that is proportional to the total amount of radiation received by the wafer. The standard 19 is of the same construction, the wafer therein having been deliberately exposed to a known level of radiation, whereby the total dosage of an unknown dosimeter may be determined by comparison with the standard acting as a reference.

In order to assure the passage of ultra-violet rays only, the optical system is provided with an ultra-violet filter 20 which is designed to transmit a narrow light spectrum. The orange light emanating from the fluorescent center of the glass specimen is projected through a yellow filter 21 onto the photosensitive element 11, the filter serving to prevent passage of scattered ultra-violet, green and blue light.

The alternating signal output of the photosensitive element 11 is fed through amplifier 12 to the rectifier and integrating circuit 13 which converts the alternating current signal to a direct-current potential which is steady for the very slow repetition rate of the signal, the magnitude of the potential being proportional to the amount of radiation received by the sample.

The output of the integrating circuit 13 is applied to the bridge circuit and acts to unbalance same to an extent determined by the magnitude of the direct potential. Zero adjustment of the bridge is made with a no signal input condition whereby the meter 15 connected to the output will indicate zero when the bridge is balanced. Meter 15 is responsive to the magnitude of the direct potential and reads the total amount of radiation to which the element has been exposed.

Primary power for the battery-operated reader is obtained from dry-cells 22 which energizes a vibrator supply 23 producing the high voltage for the ultra-violet source 10 and the relatively low B voltage for the various stages of the system. To avoid the need for an on-off indicator which imposes a drain on the battery, use is made of the light furnished by the ultra-violet source 10. A specially shaped Lucite bar 24 transmits the light from the lamp to the front panel of the instrument, thus permitting the operator to obtain an on-off indication without additional power, light bulbs or maintenance.

The Schematic Circuit

Referring now to the detailed schematic circuit in FIG. 2, the ultra-violet source 10 is in the form of an xenon-filled flash-tube having a pair of spaced electrodes across which is connected a capacitor 25, one electrode being grounded and the other being connected through a resistor 26 to a high voltage supply of approximately 1200 volts D-C. The capacitor 25 in conjunction with resistor 26 acts as an R-C timer causing periodic ionization of the xenon tube at a repetition rate of two to four pulses per second. The power consumption is extremely low and the operation is stable even after many hours of continuous operation. The xenon tube is an efficient low power-source of pulsed ultra-violet light.

The photosensitive element 11 takes the form of a photomultiplier tube having a series of dynodes 11a connected to a string of resistors 27 constituting a voltage divider and providing the properly graduated D.-C. operating voltages for each of the dynodes relative to the cathode. The capacitor 28 across the last dynode tends to prevent non-linearity in the response by bypassing any A.-C. component which may be present at higher light signals. An adjustable attenuator 29 connected between the photomultiplier 11 and the high voltage negative terminal permits selection of the total operating voltage and thus accommodation of photomultipliers of greatly different sensitivity. A capacitor 30 provides additional filtering of any A.-C. component which might be present.

The output of photomultiplier 11 is fed through an attenuator including a variable resistor 31 and a range switch 32 to the grid of an amplifier tube 33. The proper attenuation is selected by adjustment of the range switch.

The output of amplifier tube 33 is applied through potentiometer 36 to integrating circuit constituted by condenser 34 in parallel with resistor 35, a rectifier diode 37 being interposed between the wiper of the potentiometer and the integrator.

The purpose of rectifier diode 37 is twofold. Its primary function is to rectify the alternating current signal from the amplifier to form positive pulses which act to charge the integrating network to a direct-voltage level proportional to the signal. The second purpose is to prevent the stored charge from leaking back through the amplifier circuit. The diode therefore should have a high back resistance, preferably in the order of $4 \times 10^9$ ohms.

The time constant of the integrating circuit is chosen to obtain a steady D.-C. potential across capacitor 34 for the very slow repetition of the signal which is 2 to 3 cycles per second (the same as the pulse rate of the light flash). Thus the circuit "averages out" consecutive pulses if the amplitude of successive flashes are not perfectly equal and it permits attainment of excellent stability of the meter indication.

The indicating circuit contains meter 15 and the bridge circuit 14 constituted by electrometer tubes 38 and 39. These tubes are known as electrometer tubes by reason of their ability to function properly with grid resistances up to $10^{14}$ ohms. Certain precautions are taken to obtain low grid current which might otherwise cause capacitor 34 to charge even with no signal present. One such precaution is the insertion of a resistor 40 in series with the filaments of tubes 38 and 39 to maintain tube temperature below the nominal value.

The bridge functions in the usual manner, the tube 38 serving as a signal tube which is sensitive to the voltage across capacitor 34 and tube 39 acting as the matching tube providing the necessary balance voltage. Zero adjustment of bridge 14 is made by a potentiometer 41 which sets the voltage on the grid of tube 39 so that the bridge is balanced in the absence of an input signal. At balance the meter 15 will indicate zero, which signifies that no voltage difference exists between the anodes of tubes 38 and 39.

In operation, when capacitor 34 receives a charge proportional to the input signal, the potential there across will rise, causing a change in potential at the grid of the signal tube 38, thereby unbalancing the bridge and causing a potential difference between the meter terminals. The meter deflection will be proportional to the capacitor charge and hence to the input signal.

The power supply is constituted by a vibrator 42 connected to battery 22 (6 volts), the interrupted current being supplied to the primary section of a transformer 43. The high voltage pulses produced across the secondary are of short duration and are rectified by a cold cathode rectifier 44 whose output is filtered to provide the necessary high voltage for xenon tube 10 and photomultiplier 11.

A relatively low voltage is derived from a tap on the secondary by means of a diode 45, whose output is filtered by a pi-network 46, the voltage being supplied to the anodes of the various tubes. Switch 47 is connected to provide an on-off operation and to stop the vibrator when the instrument is not in use and also to provide a battery check indication.

The Loading Mechanism

Referring now to FIGS. 3 to 6, there is shown the complete instrument in which the meter 15 is supported on the front panel 48, the sliding bar 17 being receivable within a suitable opening in a side panel of the casing. Manipulation of the sliding bar is effected by means of an end plate 49 attached thereto.

The sliding bar is provided with a generally round platform 50, which is designed to have freedom of limited lateral and vertical displacement. Two pins 51 and 52 of different diameter attached to and projecting upwardly from the flat face of platform 50 are adapted to fit into two complementary holes 53 and 54 in the plastic base of the dosimeter 18. This automatically locates the dosimeter in proper position with the "exit edge" 18a (note FIG. 6) of the glass square facing the photomultiplier 11.

To obtain the reading, the operator slides the bar in with the dosimeter located on the platform, exposing the entrance face of the glass of the dosimeter to the ultra-violet light from the source 10. At the same instant a spring-biased ball detent 55, as best shown in FIGS. 5 and 6, engages the bottom face of the platform 50, lifting the dosimeter glass 18 firmly against the window wall 56 of the mechanism toward the opening of the ultra-violet filter 20 and the source of ultra-violet rays.

This operation makes it possible to maintain a uniform distance between the light source and the entrance face of the dosimeter glass independent of the geometrical differences in the dosimeter cases or mountings. To remove the dosimeter from the loading mechanism, the operator slides the bar out. This action automatically places another square 19 of fluorescent glass (FIG. 1) in "Read" position. This glass square is the standard which permits the operator to check the calibration of the system whenever a new unknown dosimeter is being measured. The value of the standard may be factory set and marked on the instruction plate of each reader mechanism.

As pointed out above, the presence of the standard has the advantage of providing a very large operating range for the instrument independently of voltage changes, temperature and aging of components.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A portable radiation dosimeter reader for accurately computing and indicating the total amount of radiation to which a test detector has been subjected comprising means energized from a battery source periodically to generate ultraviolet light pulses at a relatively slow rate, a standard detector subjected to a predetermined level of radiation, a loading mechanism for selectively exposing said standard detector and said test detector to said ultraviolet pulses to cause the exposed detector to luminesce with an intensity proportional to the radiation accumulated therein, photomultiplier means responsive to the luminescence from the exposed detector to generate a pulsatory voltage proportional thereto, means to integrate said pulsatory voltage to provide a measuring voltage, means to indicate the measuring voltage, and means to calibrate said indication means in accordance with the level of said standard detector whereby accurate readings may be had for said test detector.

2. A portable radiation dosimeter reader for accurately computing and indicating the total amount of radiation to which a silver-activated phosphate glass radiation detector has been subjected comprising a source of ultra-violet light constituted by a xenon-filled flashtube, a standard detector formed of the same material as said test detector and subjected to a predetermined level of radiation, a loading mechanism permanently incorporating said standard detector and having platform means to accommodate said test detector selectively to expose either detector to said flash tube for irradiation by ultra-violet rays to cause the exposed detector to luminesce with an intensity proportional to the radiation accumulated therein, means energized from a battery source periodically to apply voltage pulses to said flash tube to produce ultra-violet pulses at a relatively low repetition rate, photoelectric means responsive to the resultant luminescence from the exposed detector to produce voltage pulses proportional thereto, means to rectify and integrate said pulses to produce a measuring voltage, indicator means responsive to said measuring voltage, and means to calibrate said indicator means in accordance with the level of said standard detector whereby accurate readings may be had for said test detector.

3. A portable radiation dosimeter reader for accurately computing and indicating the total amount of radiation to which a silver-activated phosphate glass radiation detector has been subjected comprising a source of ultra-violet light constituted by a xenon-filled flashtube and a filter to pass only ultra-violet rays, a standard detector formed of the same material as said test detector and subjected to a predetermined level of radiation, a loading mechanism permanently incorporating said standard detector and having a platform means to accommodate said test detector selectively to expose either detector to said flash tube for irradiation by ultra-violet rays to cause the exposed detector to luminesce with an intensity proportional to the radiation accumulated therein, means energized from a battery source including a resistance-capacitance charging network periodically to apply voltage pulses to said flash tube to produce ultra-violet pulses at a relatively low repetition rate, photoelectric means responsive to the resultant luminescence from the exposed detector to produce voltage pulses proportional thereto, means to rectify and integrate said pulses to produce a measuring voltage, indicator means responsive to said measuring voltage, and means to calibrate said indicator means in accordance with the level of said standard detector whereby accurate readings may be had for said test detector.

4. A reader, as set forth in claim 3, wherein said indicator means is constituted by an electrometer bridge circuit having a volt meter coupled to the output thereof, the measuring voltage being applied to the input of said bridge to create an unbalance thereof which is indicated by said meter.

5. A reader, as set forth in claim 4, further including an on-off indicator to reveal whether the reader is operative without current drain therefrom and constituted by a light-transmitting rod for conducting light from said flash-tube to a display point on the reader.

6. A reader, as set forth in claim 3, wherein said platform for supporting said test detector has limited freedom of movement, and further including spring-biased detent means for urging said platform when in a position to expose said test detector against a wall opening into said ultra-violet source.

7. In a portable radiation dosimeter reader, a source of ultra-violet light constituted by a flash-tube, means energized from a battery source periodically to apply electrical pulses to said tube at a relatively slow rate to produce ultra-violet pulses, means to expose a radiation detector to said ultra-violet pulses to cause said detector to produce luminescent pulses with an intensity proportional to the radiation accumulated therein, photoelectric means responsive to said luminescent pulses to produce corresponding voltage pulses, means to integrate said voltage pulses to produce a measuring voltage, and means to indicate said measuring voltage.

8. A dosimeter, as set forth in claim 7, wherein said rate is not in excess of four pulses per second.

References Cited in the file of this patent

UNITED STATES PATENTS

| | | |
|---|---|---|
| 2,491,342 | Townshend | Dec. 13, 1949 |
| 2,710,924 | Morrison et al. | June 15, 1955 |
| 2,722,631 | Bowtell | Nov. 1, 1955 |
| 2,730,625 | Shurcliff | Jan. 10, 1956 |
| 2,787,714 | Schulman et al. | Apr. 2, 1957 |
| 2,809,295 | Reiffel | Oct. 8, 1957 |
| 2,883,547 | Ruderman | Apr. 21, 1959 |
| 2,935,613 | Tirico | May 3, 1960 |